Nov. 22, 1938.　　　A. J. CAWLEY　　　2,137,267

SOUND RECORD PROCESS

Original Filed June 14, 1929

INVENTOR
Aloysius J. Cawley

Patented Nov. 22, 1938

2,137,267

UNITED STATES PATENT OFFICE 2,137,267

SOUND RECORD PROCESS

Aloysius J. Cawley, Pittston, Pa.

Application June 14, 1929, Serial No. 371,020
Renewed April 15, 1938

3 Claims. (Cl. 179—100.3)

The invention relates generally to the production of talking pictures. More particularly it is concerned with the production of more accurate, contrasted and faithful photographic sound records.

The invention has as object the production of a photographic sound record by the simultaneous variation in intensity of a source of light in accordance with sound waves and the lateral vibration of a beam of light from this light source as it impinges upon a photosensitive moving surface. The variation in intensity and the lateral vibration are in exact synchronism. The resulting sound record combines the features of a photographic sound record produced by variation of intensity of light source and that produced by variation in direction of light from a light source.

Another object of the invention is the variation of a light source in synchronism with sound waves and the simultaneous variation of the intensity of a light beam from this source as it impinges upon a moving photosensitive surface by means of combined mechanical and electromagnetic means. The result is a sound record which has more contrast than ordinary records of this type.

The invention is not limited to either sound recording or talking picture production.

Reference is to be had to the accompanying drawing forming a part of this specification, in which like characters of reference denote corresponding parts in all of the views, and in which, Figure 1 is a view of photographic sound recorder impressing its record on the margin of a motion picture film by varying the intensity and direction of the light beam.

Figure 3 shows at b a photographic sound record reproduced by varying the direction of a light beam.

Figure 3 shows at c a photographic sound record produced by varying both the intensity of a light source and the direction of a beam of light from the light source.

Figure 1:
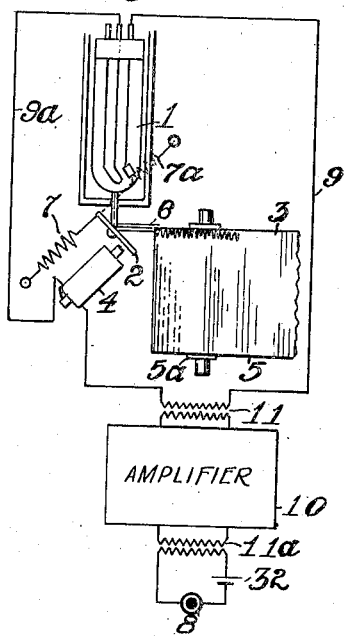

Figure 1 illustrates a method of recording sounds photographically. 1 is a light source, such as a glow lamp made of quartz and filled with helium or neon. The sounds to be recorded are picked up by any suitable device such as a microphone 8 included in a circuit with a battery 32 and primary of induction coil 11a, which latter transmits the electrically fluctuating current to the audion circuit 10, while transformer 11 transfers it to the glow lamp 1 by means of wires 9 and 9a. The light of the lamp is therefore caused to fluctuate in synchronism with the sounds to be recorded. The sound-fluctuated current in passing to light 1 by means of conductors 9 and 9a also traverses electromagnet 4. The light of the lamp 1 passes through a suitable narrow slot in the lamp casing to form beam 6. This light beam impinges upon a mirror 2 which is located on a lever which is held in a neutral position by means of springs 7 and 7a. The electromagnet 4 is placed adjacent the free end of the mirror lever 2, and attracts the latter with varying intensity in synchronism with the variations in the current traversing it. It is therefore obvious that the intensity and direction of light beam 6 is varied in synchronism with the sound waves to be recorded. This beam of light 6 plays upon the margin (or other portion) of an ordinary motion picture negative film 3 as it traverses an ordinary motion picture camera (not all shown here in accordance with rule 50). Film sprocket wheel 5 and its hub 5a are here illustrated. This is preferably the sprocket adjacent the "loop" of the motion picture film, and its speed is uniform in contrast to the intermittent motion of the film through the film gate. The result is a photographic sound record on the margin (or other portion) of the film, which is a combination of a photographic sound record produced by variation in light intensity alone and shown at a Fig. 3 and that produced by variation in direction alone of the light beam and shown at b Figure 3. The actual form of the combined sound record is shown at c of Figure 3. This type of record possesses variation in intensity of light and also in direction.

Figure 2:
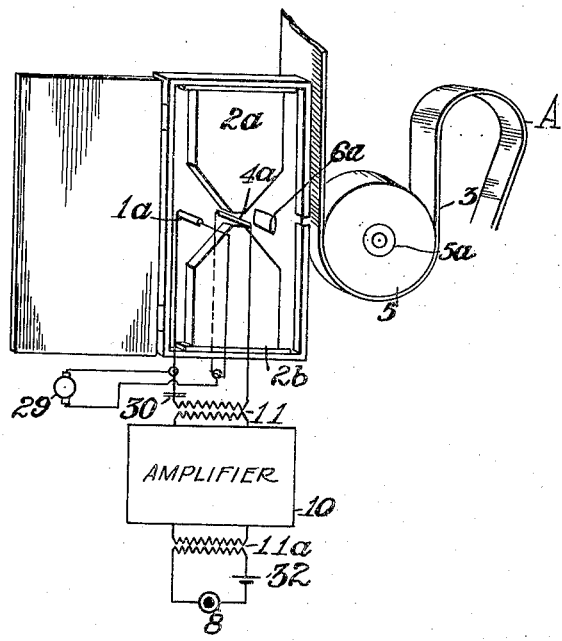
Figure 2 is a view of a photographic sound recorder impressing its record on the margin of a motion picture film traversing a motion picture camera by varying the intensity and area of the light beam.

Figure 2 illustrates a photographic process of sound recording described in my application for a patent for Electrical sound reproducing process filed January 8, 1921, Serial Number 435,983 and which depends on the variation in light intensity by two distinct processes or operations—a variation in light intensity and a simultaneous variation in the area of the light beam from said source by an electromagnetic means. The film 3 is shown traversing its camera on sprocket wheel 5 (and hub 5a). The "loop" in the film is shown at A. The sprocket wheel 5 is adjacent this "loop"

as it is well known that the film must have a continuous motion where sound is to be recorded upon it in contrast to the intermittent motion of the "loop". This film is fed past an aperture $p$ in a light-tight box which contains a source of light $1a$, which is here shown as a tubular incandescent lamp, but which may be any form of glow lamp. This lamp $1a$ is lighted by a source of electric power such as a dynamo 29. The light from this lamp traverses the aperture of an Einthoven galvanometer, whose poles are shown at $2a$ and $2b$. Between those poles is placed the usual silvered quartz thread $4a$ which carries the current. The light also passes through cylindrical lens $6a$ to facilitate focussing the light in the form of a fine, sharp line in aperture $p$. The sounds to be recorded are received by the usual microphones, one of which is shown at 8 which has included in its circuit the usual battery 32 and transformer $11a$ which transfers the sound fluctuated electric current to the audion amplifying circuit 10, which is connected to transformer 11 which transfers the current to the light source $1a$ and the silvered quartz thread $4a$. When no sound waves are impressed on the apparatus, the conductor $4a$ rests exactly midway between the poles of the magnet and more or less completely blocks the passage of the light. When sound vibrations are impressed upon the apparatus, they cause this element to be more or less pulled to one side to permit more or less light to pass in accordance with the amplitude of vibrations. It is obvious that the current traversing the light source varies its intensity and traversing the quartz thread varies the area of the light beam between poles $2a$ and $2b$. The intensity of the light is simultaneously varied by two distinct means. The result is a photographic sound record of the form shown at $a$ of Figure 4, but which is of much greater contrast because of the fact that when the light source is at its brightest the quartz thread is pulled away so as to increase the area of the light beam between the poles $2a$ and $2b$, and much more intense dark bands result on the film. Conversely, when the light is at its weakest, the silvered thread $4a$ is in the center of the aperture and acts to more or less completely obstruct the passage of the light beam, and the result is a much less intensity in the bands produced on the negative photographic record.

Figure 3:
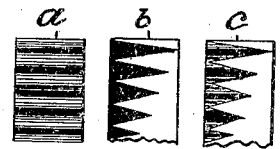
Figure 3 shows at a a photographic sound record produced by varying the intensity of the light source.

Figure 3 shows three types of photographic sound records at $a$, $b$ and $c$. A photographic sound record is shown at $a$ which is produced by varying the intensity of the light only. This record is the result of the process and apparatus shown at Figure 2. A photographic sound record which is the result of varying the direction only of a light beam is shown at $b$. U. S. Patent No. 1,598,377 describes a method of producing such a record. A photographic record which is a combination of those two is shown at $c$ and is produced by simultaneously varying the intensity of a light source and the direction of its light beam. This is the result of the process and apparatus illustrated in Figure 1.

Record $c$ of Figure 3 is equivalent to that obtained by cutting a deeper and wider "valley" between the "peaks" of record $b$ of the same figure. If this were done, it would be necessary to extend the bases of the "peaks" in record $b$ laterally. There is much greater variation of form in record $c$, and this great variation means increased fidelity of recording the more complicated sounds, such as voice, music, etc. The timbre depends on the form of the sound waves, and the variety of the form of the record $c$ is capable of much more faithful recording.

This application is a continuation in part of my application Ser. No. 435,983, mentioned above.

It is to be noted that Figs. 1 and 2 cover the production of talking pictures. In Figure 2 one may also utilize as a light beam area controller the ordinary magnetically operated grid, such as that described in British patent to Haines et al., Serial Number 18,057, August 11, 1906.

Having described my invention, I claim as new and desire to secure by Letters Patent:

1. A sound recording apparatus consisting of a light source supplied with sound modulated electric current, a pair of magnetic poles separated by a narrow space through which light from said source passes to form a beam thereof, a conductor supplied with said sound modulated current and disposed in said space between said poles and vibrating in said space under the influence of said current, a cylindrical lens in the path of said beam and acting to unilaterally converge said beam, a slit limiting the area of said beam to form a fixed beam of uniform cross sectional area and a photo-sensitive surface in contact with said beam after its passage through said aperture to have its substance photochemically altered by said light beam to form a developable sound record of great contrast.

2. An apparatus for recording sound by doubly modulating a light beam, consisting of a glow lamp, two magnetic poles adjacent said glow lamp and separated by a short microscopic interval through which the light from said lamp passes to form a microscopic beam, a vibratable electric conductor placed in said interval, a source of sound modulated electric current connected to said lamp to vary the intensity thereof and to said conductor to cause a vibration thereof to vary the intensity of said beam, a slit in the path of said beam to delineate and fix the area thereof and a movable photosensitive surface adjacent said slit and in contact with said beam in order that the substance of said beam may be photochemically altered by said light beam to produce a developable sound record of great intensity.

3. A sound recording apparatus consisting of a light source supplied with sound modulated electric current to vary its intensity in accordance with sounds, a pair of magnetic poles separated by a narrow microscopic interval through which light from said source passes to form a narrow rectangular beam of microscopic dimensions, a conductor also supplied with said sound modulated current disposed in said interval and vibrating therein under the influence of said current and said poles and a moving photosensitive surface upon which said beam impinges to chemically alter the substance of said surface to form a developable photographic sound record.

ALOYSIUS J. CAWLEY.